United States Patent
Gladnick et al.

(10) Patent No.: US 11,714,051 B2
(45) Date of Patent: Aug. 1, 2023

(54) METROLOGY SYSTEM CONFIGURED TO MEASURE APERTURES OF WORKPIECES

(71) Applicant: Mitutoyo Corporation, Kanagawa-ken (JP)

(72) Inventors: Paul Gerard Gladnick, Seattlle, WA (US); Joseph Daniel Tobiason, Bothell, WA (US)

(73) Assignee: Mitutoyo Corporation, Kanagawa-ken (JP)

( * ) Notice: Subject to any disclaimer, the term of this patent is extended or adjusted under 35 U.S.C. 154(b) by 49 days.

(21) Appl. No.: 17/538,774

(22) Filed: Nov. 30, 2021

(65) Prior Publication Data

US 2023/0168209 A1    Jun. 1, 2023

(51) Int. Cl.
*G01N 21/95* (2006.01)
*G01N 21/88* (2006.01)

(52) U.S. Cl.
CPC ......... *G01N 21/95* (2013.01); *G01N 21/8806* (2013.01); *G01N 21/8851* (2013.01)

(58) Field of Classification Search
CPC . G01N 21/95; G01N 21/8806; G01N 21/8851
USPC ...................... 356/237.1–237.6, 239.1–239.8
See application file for complete search history.

(56) References Cited

U.S. PATENT DOCUMENTS

| | | | |
|---|---|---|---|
| 5,197,105 A * | 3/1993 | Uemura | G01R 31/309 348/126 |
| 6,542,180 B1 | 4/2003 | Wasserman et al. | |
| 7,627,162 B2 | 12/2009 | Blanford et al. | |
| 8,194,307 B2 | 6/2012 | Arnold et al. | |
| 8,581,162 B2 | 11/2013 | Campbell | |
| 9,060,117 B2 | 6/2015 | Bryll et al. | |
| 9,143,674 B2 | 9/2015 | Gladnick | |
| 9,726,876 B2 | 8/2017 | Bryll | |
| 9,736,355 B1 | 8/2017 | Bryll | |
| 9,830,694 B2 | 11/2017 | Bryll | |
| 9,930,243 B2 | 3/2018 | Gladnick et al. | |

(Continued)

OTHER PUBLICATIONS

Mermillod-Blondin et al., "High-speed varifocal imaging with a tunable acoustic gradient index of refraction lens," Department of Mechanical and Aerospace Engineering, Princeton University, Optics Letters, vol. 33(18), Princeton, New Jersey, Sep. 15, 2008, 3 pages.

*Primary Examiner* — Tri T Ton
(74) *Attorney, Agent, or Firm* — Seed IP Law Group LLP

(57) ABSTRACT

A metrology system includes front and back vision components portions. The front vision components portion includes a light source, camera, variable focal length (VFL) lens, and objective lens defining an optical axis. The back vision components portion may include a reflective surface and a polarization altering component. A workpiece with apertures is located between the front and back vision components portions. For each aperture of the workpiece, the system adjusts a relative position between the front vision components portion and the workpiece to align its optical axis with each aperture such that light from the light source passes through the aperture and is reflected by the reflective surface of the back vision components portion. The system uses the VFL lens and camera to acquire an image stack including images of the aperture, and analyzes the image stack to determine a measurement related to a workpiece feature of the aperture.

21 Claims, 7 Drawing Sheets

(56) References Cited

U.S. PATENT DOCUMENTS

| | | |
|---|---|---|
| 10,101,572 B2 | 10/2018 | Bryll et al. |
| 10,178,321 B2 | 1/2019 | Emtman et al. |
| 10,520,650 B2 | 12/2019 | Freerksen et al. |
| 10,880,468 B1 | 12/2020 | Bryll |
| 11,112,541 B2 | 9/2021 | Tobiason |
| 11,119,382 B2 | 9/2021 | Gladnick |
| 11,125,967 B2 | 9/2021 | Gladnick |
| 11,249,225 B2 | 2/2022 | Gladnick |
| 2021/0372769 A1 | 12/2021 | Eiles |

* cited by examiner

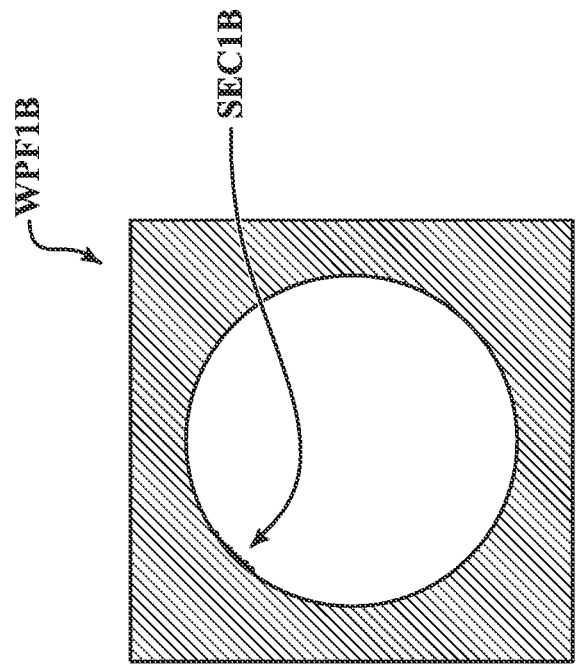
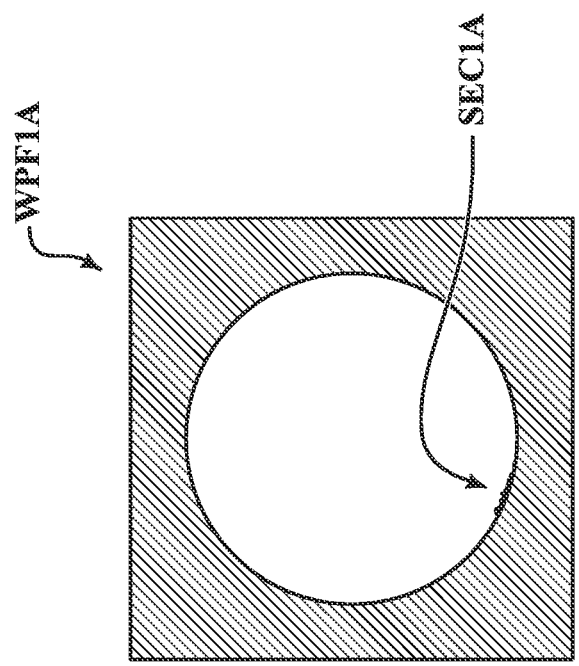

METROLOGY SYSTEM CONFIGURED TO MEASURE APERTURES OF WORKPIECES

BACKGROUND

Technical Field

This disclosure relates to precision metrology, and more particularly to precision workpiece measurement systems.

Description of Related Art

Quality control for the production of objects (e.g., workpieces) that include specific features (e.g., produced by molding and/or machining, or the like), is becoming increasingly demanding in terms or throughput, measurement resolution, and accuracy. Ideally, such workpieces should be measured/inspected to ensure proper dimensions, function, etc. However, micron level, or even sub-micron level, measurement tolerances may be required in order to confirm a workpiece with desired characteristics for some applications.

Various precision metrology systems may be used for workpiece measurements and inspection. For example, certain precision metrology systems such as machine vision inspection systems (or "vision systems" for short) may be utilized to obtain images of workpieces for inspection. Such systems may be utilized for various types of applications (e.g., general workpiece inspection, metrology applications for determining precise dimensional measurements of workpieces, etc.).

Such metrology systems have typically faced various types of challenges for measuring and inspecting workpieces (e.g., due to variations in the types of features of the workpieces, the amount of time required for measurement and inspection of certain workpieces, etc.). A system that can provide improvements with respect to such issues for certain types of measurement and inspection operations would be desirable.

BRIEF SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

According to one aspect, a metrology system is provided which includes a front vision components portion, a back vision component portion, a movement mechanism, one or more processors, and a memory. The front vision components portion includes a light source; a variable focal length (VFL) lens that is controlled to periodically modulate optical power of the VFL lens over a range of optical powers that occur at respective phase timings within the periodic modulation; an objective lens that inputs workpiece light arising from a workpiece which is illuminated by the light source, and transmits the workpiece light along an imaging optical path that passes through the VFL lens, the objective lens defining an optical axis of the front vision components portion; and a camera that receives the workpiece light transmitted by the VFL lens along the imaging optical path and provides a corresponding workpiece image exposure. The back vision components portion includes a reflective surface, wherein the metrology system is configured to have the workpiece positioned between the front vision components portion and the back vision components portion. The movement mechanism is configured to adjust a relative position between the front vision components portion and the workpiece in a direction that is transverse to the optical axis of the front vision components portion. The memory is coupled to the one or more processors and stores program instructions that when executed by the one or more processors cause the one or more processors to at least: (a) utilize the movement mechanism to adjust a relative position between the front vision components portion and the workpiece to align the optical axis of the front vision components portion with an aperture of the workpiece such that at least a portion of the light from the light source that is provided along the optical axis passes through the aperture and is reflected by the reflective surface of the back vision components portion to travel back to the aperture for providing at least part of the illumination for imaging the aperture; (b) utilize the camera to acquire an image stack comprising a plurality of images of the aperture as illuminated at least in part by light from the light source, wherein each image of the image stack corresponds to a different focus position along the optical axis of the front vision components portion as corresponding to a phase timing of the periodic modulation of the optical power of the VFL lens; and (c) determine a measurement related to a workpiece feature of the aperture based at least in part on an analysis of the image stack.

According to another aspect, for each image of the image stack, the light source is controlled to provide at least one instance of strobed illumination timed to correspond with a respective phase timing of the periodically modulated focus position that corresponds to the respective focus position for that respective image of the image stack.

According to another aspect, the analysis of the image stack comprises determining an image of the image stack in which the workpiece feature is in focus, and the measurement comprises a dimension, such as a diameter, of the workpiece feature that is determined based at least in part on the in focus image.

According to another aspect, the analysis of the image stack comprises determining focus curve data for the image stack which indicates a focus position at which the workpiece feature is in focus. For example, the workpiece feature is a first workpiece feature of the aperture and the focus position is a first focus position, and the focus curve data indicates a second focus position at which a second workpiece feature of the aperture is in focus, wherein the measurement comprises a distance between the first workpiece feature and the second workpiece feature. For example, the aperture may comprise a through-hole portion, and the first and second workpiece features correspond to an exit and entrance of the through-hole portion, respectively.

According to another aspect, the aperture has an aspect ratio of greater than 2 to 1.

According to another aspect, the back vision components portion may include a polarization altering component that alters the polarization of the light from the light source that is reflected back to the aperture. For example, the polarization altering component may comprise at least one of a waveplate or a retarder, such as a film retarder. The back vision components portion may further include a diffuser.

According to another aspect, the front vision components portion may include a polarization altering component that alters the polarization of light from the light source.

According to another aspect, the camera may include a polarization altering component that alters the polarization of light received from the VFL lens.

According to another aspect, the front vision components portion may include a first linear polarizer that provides first linear polarization of light from the light source, and a second linear polarizer that provides second linear polarization of workpiece light that travels through the VFL lens to the camera, wherein the second linear polarization is orthogonal to the first linear polarization.

According to a further aspect, a method is provided for operating a metrology system. The method includes:

(a) adjusting a relative position between a front vision components portion of the metrology system and a workpiece to align an optical axis of the front vision components portion with an aperture of the workpiece, wherein the front vision components portion comprises a light source, a variable focal length (VFL) lens, an objective lens that defines the optical axis of the front vision components portion, and a camera, for which at least a portion of the light from the light source that is provided along the optical axis passes through the aperture of the workpiece and is reflected by a reflective surface of a back vision components portion of the metrology system to travel back to the aperture for providing illumination for imaging the aperture;

(b) acquiring an image stack comprising a plurality of images of the aperture as illuminated at least in part by light from the light source, wherein each image of the image stack corresponds to a different focus position along the optical axis of the front vision components portion as corresponding to a phase timing of a periodic modulation of optical power of the VFL lens; and (c) determining a measurement related to a workpiece feature of the aperture based at least in part on an analysis of the image stack.

According to another aspect, for each image of the image stack, the light source is controlled to provide at least one instance of strobed illumination timed to correspond with a respective phase timing of the periodically modulated focus position that corresponds to the respective focus position for that respective image of the image stack.

According to another aspect, the analysis of the image stack comprises determining focus curve data for the image stack which indicates a focus position at which the workpiece feature is in focus. For example, the workpiece feature is a first workpiece feature of the aperture and the focus position is a first focus position, and the focus curve data indicates a second focus position at which a second workpiece feature of the aperture is in focus, wherein the measurement comprises a distance between the first workpiece feature and the second workpiece feature.

According to a still further aspect, a metrology system is provided, which includes a front vision components portion and a back vision components portion. The front vision components portion includes a light source; a variable focal length (VFL) lens that is controlled to periodically modulate optical power of the VFL lens over a range of optical powers that occur at respective phase timings within the periodic modulation; an objective lens that inputs workpiece light arising from a workpiece which is illuminated by the light source, and transmits the workpiece light along an imaging optical path that passes through the VFL lens, the objective lens defining an optical axis of the front vision components portion; and a camera that receives the workpiece light transmitted by the VFL lens along the imaging optical path and provides a corresponding workpiece image exposure. The back vision components portion includes a reflective surface. The metrology system is configured to:

(a) adjust a relative position between the front vision components portion and a workpiece to align the optical axis of the front vision components portion with an aperture of the workpiece such that at least a portion of the light from the light source that is provided along the optical axis passes through the aperture and is reflected by the reflective surface of the back vision components portion to travel back to the aperture for providing at least part of the illumination for imaging the aperture;

(b) acquire an image stack comprising a plurality of images of the aperture as illuminated at least in part by light from the light source, wherein each image of the image stack corresponds to a different focus position along the optical axis of the front vision components portion as corresponding to a phase timing of the periodic modulation of the optical power of the VFL lens; and (c) determine a measurement related to a workpiece feature of the aperture based at least in part on an analysis of the image stack.

BRIEF DESCRIPTION OF THE SEVERAL VIEWS OF THE DRAWINGS

The foregoing aspects and many of the attendant advantages of this invention will become more readily appreciated as the same become better understood by reference to the following detailed description, when taken in conjunction with the accompanying drawings, wherein:

FIGS. 6A and 6B are relatively in-focus images of first and second workpiece features of an aperture that are located at different Z-coordinates, such as an entrance and an exit of a through-hole portion of the aperture, which may be captured by a metrology system operated according to principles disclosed herein.

DETAILED DESCRIPTION

Figure 1:
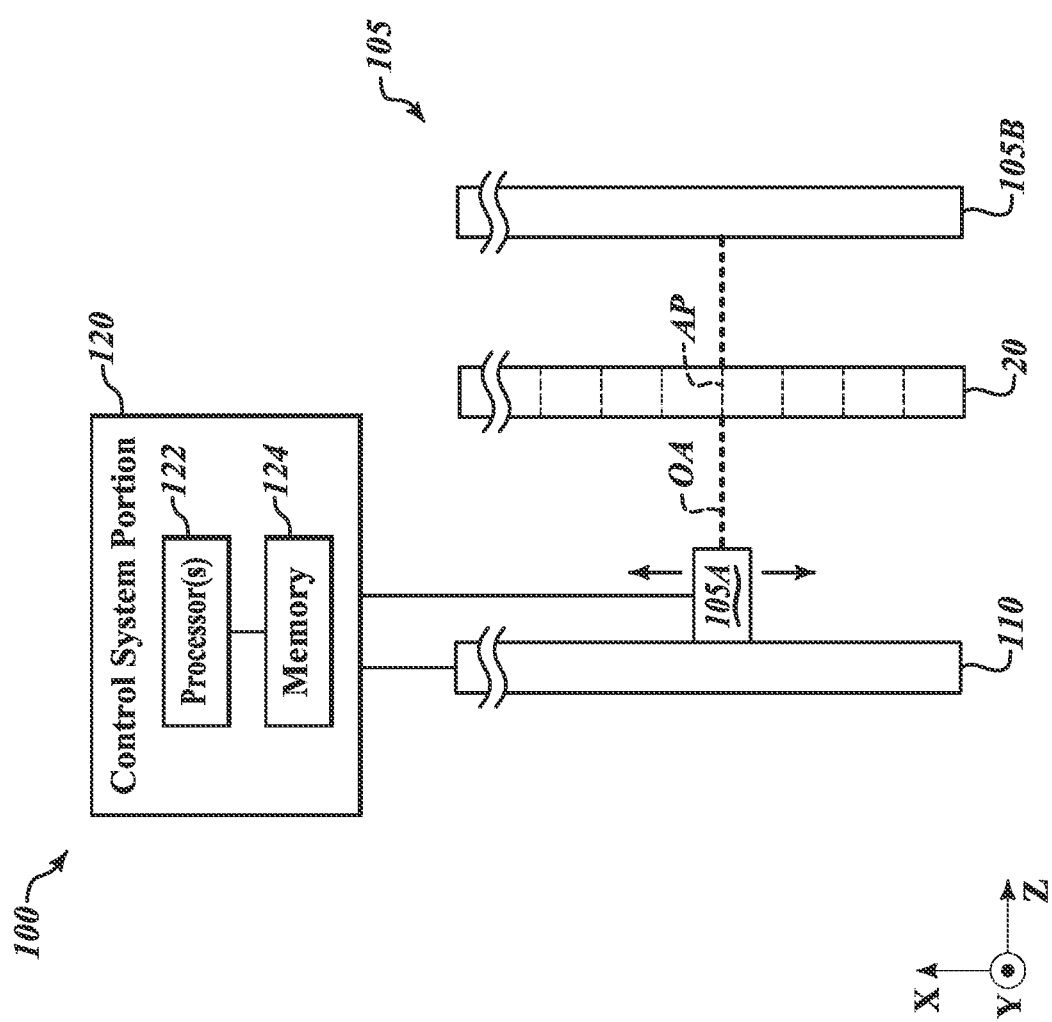
FIG. 1 is a schematic diagram of a metrology system that includes a front vision components portion and a back vision components portion and that may be operated according to principles disclosed herein.

Referring to FIG. 1, a metrology system 100 includes a vision components portion 105 and a control system portion 120. The vision components portion 105 includes a front vision components portion 105A, a back vision component portion 105B, and a movement mechanism 110. A workpiece 20 includes a plurality of apertures (e.g., shown at different X-axis locations as represented by dotted lines, and for which additional apertures may be included in the workpiece, such as approximately arranged in rows and/or columns, with each aperture having a unique X-axis and Y-axis location in the workpiece). Examples of apertures will be described in more detail below with respect to FIGS. 2, 3, 6A and 6B. The apertures (e.g., including throughholes) each extend along the Z-axis through the workpiece 20. A particular example aperture AP is shown as aligned along an optical axis OA of the front vision components portion 105A in the example of FIG. 1.

The movement mechanism 110 is controlled (e.g., by the control system portion 120) to move the front vision components portion 105A (e.g., back and forth and up and down in directions along the X-axis and the Y-axis) to acquire images of each aperture AP. For imaging each aperture, the optical axis OA of the front vision components portion 105A is aligned with the aperture (e.g., similar to the aperture AP as shown in FIG. 1), and at least some source light from the front vision components portion 105A passes through the aperture, and is reflected back by a reflective surface provided in the back vision components portion 105B to better illuminate the aperture (e.g., in particular a back side of the aperture facing and/or closer to the back vision components portion 105B) for imaging by a camera that is included in the front vision components portion 105A. In various implementations, the back vision components portion 105B may have dimensions along the X and Y axes that are similar to the dimensions of the workpiece 20 along the X and Y axes (e.g., so that the reflective surface of the back vision components portion 105 will continue to be behind each aperture of the plurality of apertures of the workpiece 20 without requiring movement of the back vision components portion 105 or the workpiece 20 during the imaging of the different apertures of the workpiece). The front vision components portion 105A may have relatively smaller dimensions along the X and Y axes and as noted above may be moved by the movement mechanism 110 (e.g., to a unique X-axis and Y-axis location for imaging each aperture). Further details of the configuration and operation of the metrology system 100 are described in reference to FIGS. 2 and 3 below.

The apertures (e.g., including through-hole portions) as defined in a workpiece, can be advantageously imaged and measured according to the present invention. In various implementations, the apertures may have a relatively high aspect ratio (e.g., of greater than 2 to 1). Such apertures may include, for example, Through Silicon Vias (TSV), aircraft through-hole features for skin panel fastening, through-holes in any large and/or thick workpieces, etc.

The control system portion 120 includes one or more processors 122 and a memory 124 coupled to the one or more processors and storing program instructions that when executed by the one or more processors cause the one or more processors to perform the functions described herein.

Those skilled in the art will appreciate that the control system portion 120 (e.g., including or implemented in a computing system, etc.), and/or other processing or control systems described or usable with the elements and methods described herein, may generally be implemented using any suitable computing system or device, including distributed or networked computing environments, and the like. Such systems or devices may include one or more general purpose or special purpose processors 122 (e.g., non-custom or custom devices) that execute software (e.g., including stored program instructions) to perform the functions described herein. Such software may be stored in memory 124, such as random access memory (RAM), read only memory (ROM), flash memory, or the like, or a combination of such components. Software may also be stored in other types of memory 124, such as one or more storage devices, including optical based disks, flash memory devices, or any other type of non-volatile storage medium for storing data. Software may include program instructions implementing one or more program modules that include processes, routines, programs, objects, components, data structures, and so on that perform particular tasks or implement particular abstract data types. In distributed computing environments, the functionality of the program modules may be combined or distributed across multiple computing systems or devices and accessed via service calls, either in a wired or wireless configuration.

Figure 2:
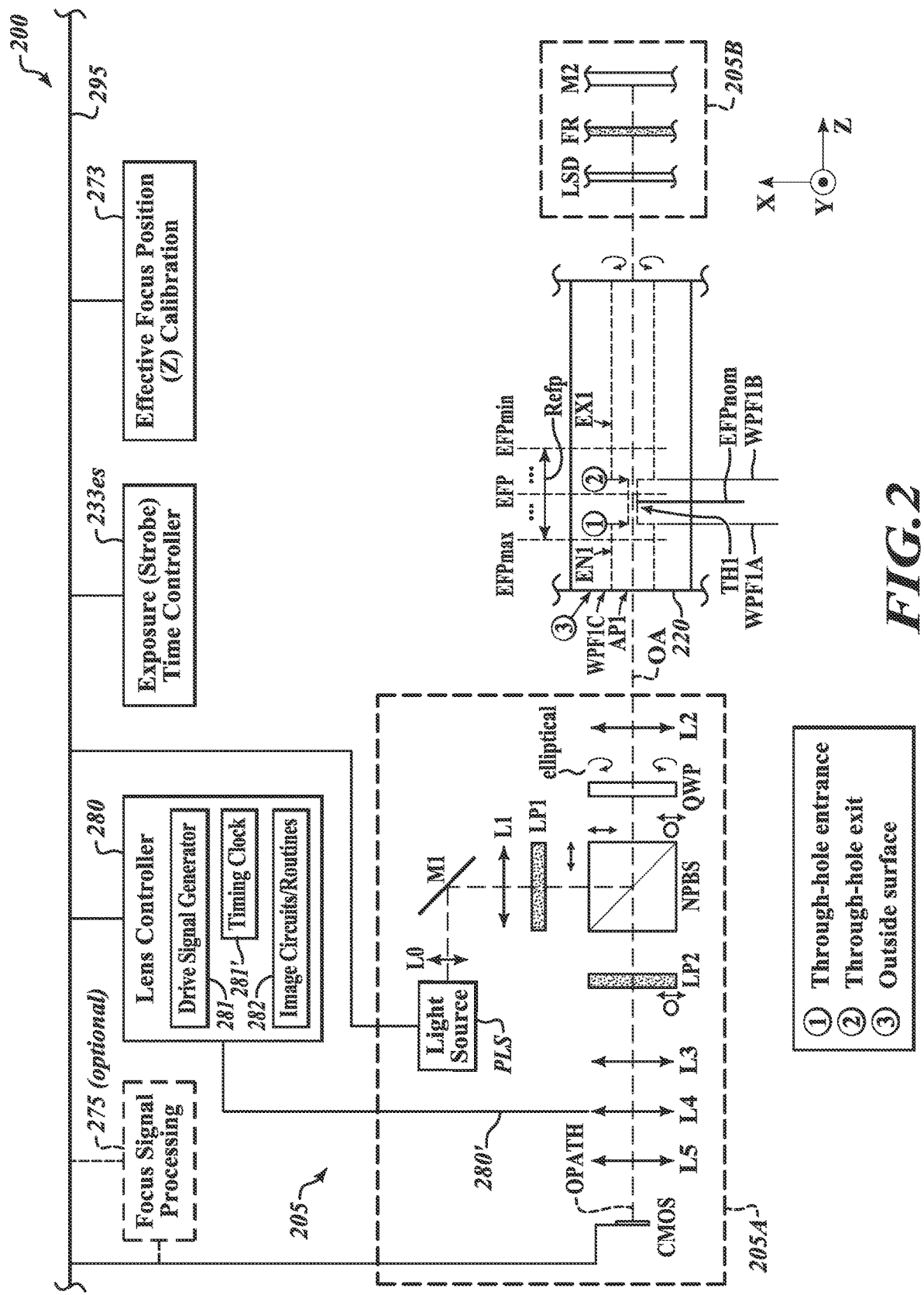
FIG. 2 is another schematic diagram of a metrology system that includes a front vision components portion and a back vision components portion and that may be operated according to principles disclosed herein.

FIG. 2 is a schematic diagram of a metrology system 200 that may be operated according to principles disclosed herein.

As will be described in more detail below, an imaging optical path OPATH (also called a workpiece imaging optical path herein) comprises various optical components arranged along a path that conveys image light from a workpiece 220 to a camera CMOS (e.g., a "CMOS" camera as part of an optical system of the metrology system 200). The image light is generally conveyed along the direction of the optical axes OA of the various components. In the implementation shown in FIG. 2, the optical axes OA of various components are aligned. However, it will be appreciated that this implementation is intended to be exemplary only and not limiting. More generally, the imaging optical path OPATH may include mirrors and/or other optical elements, and may take any form that is operational for imaging the workpiece 220 using the camera CMOS according to known principles. In the illustrated implementation, the imaging optical path OPATH includes a VFL lens L4 and is utilized at least in part for imaging workpiece features of an aperture AP1 of the workpiece 220 during workpiece image exposures, along the optical axis OA of the front vision components portion 205A.

As shown in FIG. 2, the metrology system 200 includes the front vision components portion 205A (e.g., which is coupled to and movable by a movement mechanism, such as the movement mechanism 110 of FIG. 1) and the back vision components portion 205B. The metrology system 200 also includes a control system portion (e.g., such as the control system portion 120 of FIG. 1) which, in the illustrated example, comprises a lens controller 280, an exposure (strobe) time controller 233es, an effective focus position (Z-coordinate) calibration portion 273, and a workpiece focus signal processing portion 275 (optional), to be described later. In various implementations, additional components may also be included in the control system portion, for implementing the various functions as described herein. In various implementations, various components of the control system portion (e.g., including controllers, portions, etc.), and/or the front vision components portion 205A may be interconnected by direct connections or one or more data/control busses (e.g., a system signal and control bus 295), and/or application programming interfaces, etc., and/or may be implemented, controlled and/or utilized by program instructions stored in a memory (e.g., memory 124) that are executed by one or more processors (e.g., processors 122) to perform the functions described herein.

The front vision components portion 205A includes a light source PLS, the VFL lens L4, an objective lens L2, and the camera CMOS. In the illustrated example, the front vision components portion 205A further includes relay optics L3 (e.g., that may include, for example, a tube lens and/or a relay lens, etc.), and a tube lens L5.

In the general configuration shown in FIG. 2, the light source PLS may be a "coaxial" or other light source configured to emit the source light (e.g., with strobed/pulsed or continuous illumination) along an illumination path including a collimation lens L0, a reflecting mirror M1, a focus lens L1, a first linear polarizer LP1, a Non-Polarizing Beam Splitter NPBS, and a quarter waveplate QWP toward the objective lens L2 to illuminate and image the workpiece 220. In various alternative implementations, a Polarizing Beam Splitter PBS may be utilized in place of the Non-Polarizing Beam Splitter NPBS. In various implementations, strobed/pulsed illumination may be utilized in conjunction with the operation of the VFL lens L4 (e.g., as will be described in more detail below). In various implementations, strobed/pulsed illumination and/or continuous illumination may also or alternatively be utilized as part of certain other operations (e.g., where the front vision components portion 205A is mechanically moved along the Z-axis direction by the movement mechanism 110 of FIG. 1, or other movement mechanism, to be closer to or further from the workpiece 220 so as to change the focus position, etc.).

After the workpiece 220 is illuminated, the objective lens L2 inputs the workpiece light arising from the workpiece 220, and transmits the workpiece light along the workpiece imaging optical path OPATH that passes through the VFL lens L4. As shown, the objective lens L2 defines the optical axis OA of the front vision components portion 205A. In the illustrated example, the workpiece imaging optical path OPATH includes the objective lens L2, along with the quarter waveplate QWP, the Non-Polarizing Beam Splitter NPBS, a second linear polarizer LP2, the relay optics L3, the VFL lens L4, the tube lens L5 and the camera CMOS. The camera CMOS receives the workpiece light transmitted by the VFL lens L4 along the imaging optical path OPATH and provides a corresponding workpiece image exposure, as will be more fully described below. It will be appreciated that the configuration of the imaging optical path OPATH is not limited to the particular example illustrated in FIG. 2 and may be adapted to include more or less components as well as different components to meet the physical and/or optical specifications of each application.

The VFL lens L4 is controlled to periodically modulate optical power of the VFL lens over a range of optical powers that occur at respective phase timings within the periodic modulation. In various implementations, the VFL lens L4 may be a tunable acoustic gradient ("TAG" or "TAGLENS") lens that creates a lensing effect using sound waves in a fluid medium. The sound waves may be created by application of an electrical field at a resonant frequency to a piezoelectric tube surrounding the fluid medium to create a time varying density and index of refraction profile in the lens's fluid, which modulates its optical power and thereby the focal length (or effective focus position) of its optical system. A TAG lens may be used to periodically sweep a range of focal lengths (i.e., to periodically modulate its optical power) at a resonant frequency greater than 30 kHz, or greater than 70 kHz, or greater than 100 kHz, or greater than 400 kHz, up to 1.0 MHz for example, at a high speed. Such a lens may be understood in greater detail by the teachings of the article, "High speed varifocal imaging with a tunable acoustic gradient index of refraction lens" (Optics Letters, Vol. 33, No. 18, Sep. 15, 2008), which is hereby incorporated herein by reference in its entirety. TAG (aka TAGLENS) lenses and related controllable signal generators are available, for example, from Mitutoyo Corporation of Kanagawa, Japan. As a specific example, certain TAG lenses are capable of periodic modulation having a modulation frequency of up to 1.0 MHz. Various aspects of operating principles and applications of TAG lenses are described in greater detail in U.S. Pat. Nos. 10,178,321; 10,101,572; 9,930,243; 9,736,355; 9,726,876; 9,143,674; 8,194,307; and 7,627,162, each of which is hereby incorporated herein by reference in its entirety.

As will be described in more detail below, in various implementations, the VFL lens controller 280 may control a drive signal of the VFL lens L4 to periodically modulate optical power of the VFL lens over a range of optical powers that occur at respective phase timings within the periodic modulation (e.g., as will be described in more detail below with respect to FIGS. 4 and 5). The camera CMOS (e.g., including an imaging detector, such as a "CMOS" imaging detector) receives light transmitted along the imaging optical path OPATH through the VFL lens L4 and provides a corresponding workpiece image exposure. An effective focus position EFP in front of the objective lens L2 during an image exposure corresponds to the optical power of the VFL lens L4 during that image exposure. The exposure time controller 233es is configured to control an image exposure timing used for a camera image, as will be more fully described below.

In FIG. 2, only a portion of the workpiece 220 is shown which includes an example aperture AP1 amongst a potentially large number of apertures existing throughout the workpiece 220. In some implementations there may be many hundreds or thousands of apertures in a workpiece, for which, as will be described in more detail below, the configurations as disclosed herein may enable relatively rapid imaging of the apertures as part of processes for inspecting such workpieces. The example aperture AP1 of FIG. 2 comprises an entrance portion EN1, a through-hole portion TH1, and an exit portion EX1. The through-hole portion TH1 comprises a first workpiece feature WPF1A (e.g., the entrance of the through-hole portion TH1) and a second workpiece feature WPF1B (e.g., the exit of the through-hole portion TH1). The illumination light from the light source PLS via the objective lens L2 enters the aperture AP1 via the entrance portion EN1, and travels through the through-hole portion TH1 via the first workpiece feature WPF1A and the second workpiece feature WPF1B, and exits the aperture AP1 through the exit portion EX1 to be received by the back vision components portion 205B including a reflective surface M2. The reflective surface M2 may comprise, for example, a mirror. In the illustrated example, the back vision components portion 205B additionally includes a diffuser LSD, such as a light shaping diffuser, and a polarization altering component FR, such as a waveplate (e.g., a quarter waveplate QWP) or a retarder (e.g., a film retarder).

In some exemplary embodiments, for imaging the first workpiece feature WPF1A, the illumination light from the light source PLS may primarily reflect from the edges of the entrance of the through-hole portion TH1, for which the objective lens L2 then receives the corresponding reflected workpiece light. For imaging the second workpiece feature WPF1B, the light propagation path may be more complex, for which at least a portion of the source illumination light travels through the through-hole portion TH1 and along the imaging optical path OPATH (i.e., along the optical axis OA) through the diffuser LSD and the polarization altering component FR, to be reflected by the reflective surface M2 to travel back through the polarization altering component FR and the diffuser LSD and the through-hole portion TH1, and for which at least a portion of that light that passes back through the through-hole portion TH1 is utilized for the imaging of the second workpiece feature WPF1B, and is received by the objective lens L2.

The objective lens L2 inputs the image light (workpiece light) that is focused at an effective focus position EFP (e.g., within the aperture AP1), and outputs the image light to travel back through the quarter waveplate QWP, the Non-Polarizing Beam Splitter NPBS, the second linear polarizer LP2 and the relay optics L3 to the VFL lens L4. The VFL lens L4 receives the image light and outputs it to the tube lens L5. The tube lens L5 receives the image light and outputs it to the camera CMOS. In various implementations, the objective lens L2 may be an interchangeable objective lens. In various implementations, any of the lenses referenced herein may be formed from or operate in conjunction with individual lenses, compound lenses, etc.

In various implementations, the camera CMOS captures a camera image during an image exposure (e.g., during an integration period of the camera CMOS) also referred to as an image exposure period, and may provide the corresponding image data to the control system portion. Some camera images may include a workpiece image (e.g., including a workpiece feature of the aperture AP1 of the workpiece 220) provided during a workpiece image exposure. In some implementations, an image exposure (e.g., a workpiece image exposure) may be limited or controlled by a strobe timing of the light source PLS that falls within an image integration period of the camera CMOS. In various implementations, the camera CMOS may have a pixel array greater than 1 megapixel (e.g., 1.3 megapixel, with a 1280× 1024 pixel array, with 5.3 microns per pixel). In the example of FIG. 2, the relay optics L3, the VFL lens L4 and the tube lens L5 may be in a configuration intended to maintain telecentricity at the workpiece 220, and may minimize scale change and image distortion (e.g., including providing constant magnification for each effective focus position (Z-coordinate) of the workpiece 220).

In various implementations, the lens controller 280 may include a drive signal generator portion 281, a timing clock 281', and imaging circuits/routines 282. The drive signal generator portion 281 may operate (e.g., in conjunction with the timing clock 281') to provide a periodic drive signal to the VFL lens L4 via a signal line 280' and may also generate and provide a synchronization signal to the light source PLS. In various implementations, the lens controller 280 may generally perform various functions related to imaging the workpiece 220 in a manner synchronized with a desired phase timing of the VFL lens L4, as well as controlling, monitoring and adjusting the driving and response of the VFL lens L4. In various implementations, the image circuits/routines 282 perform imaging operations for the optical system (e.g., as may be synchronized with the phase timing of the VFL lens L4).

With respect to the general operations of the VFL lens L4, in various implementations as described above, the lens controller 280 may rapidly adjust or modulate the optical power of the VFL lens L4 periodically, to achieve a high-speed VFL lens capable of a periodic modulation (i.e., at a VFL lens resonant frequency) such as 250 kHz, or 70 kHz, or 30 kHz, or the like. As shown in FIG. 2, by using the periodic modulation of a signal to drive the VFL lens L4, the effective focus position EFP of the front vision components portion 205A of the metrology system 200 (e.g., the focus position in front of the objective lens L2) may be rapidly moved within a range Refp (e.g., an autofocus search range or focus range, etc.) bound by an effective focus position EFPmax corresponding to a maximum optical power of the VFL lens L4 in combination with the objective lens L2, and an effective focus position EFPmin corresponding to a maximum negative optical power of the VFL lens L4 in combination with the objective lens L2. In various implementations, the effective focus positions EFPmax and EFPmin may approximately correspond to phase timings of 90 degrees and 270 degrees. In various implementations, an approximate middle of the range Refp may be designated as an effective focus position EFPnom, and may correspond to zero optical power of the VFL lens L4 in combination with the nominal optical power of the objective lens L2. According to this description, the effective focus position EFPnom may approximately correspond to the nominal focal length of the objective lens L2 in some implementations (e.g., which may correspond to a working distance of the objective lens L2).

In various implementations, the modulation of the VFL lens L4 may be utilized to acquire an image stack, such as described in U.S. Pat. Nos. 9,143,674 and 9,830,694, each of which is hereby incorporated herein by reference in its entirety. As described in the incorporated references, a periodically modulated focus position of the metrology system 200 of FIG. 2 may be controlled by periodically modulating the focal length of a VFL lens L4 (e.g., a TAG lens) in the metrology system 200. In various implementations, strobed illumination (e.g., from the light source PLS as controlled by the exposure time controller 233es) can be timed to correspond with a respective phase timing of the periodically modulated focus position to expose an image focused at a respective Z-coordinate. That is, while the camera CMOS is acquiring an image during an integration period, if a short strobe pulse is provided at a phase timing $\phi 0$, then the focus position will be at a height $z\phi 0$, and any workpiece surface of a workpiece feature of the aperture AP1 that is located at the height $z\phi 0$ will be in focus in the resulting image. Similar principles are applied for other exemplary phase timings and Z-coordinates throughout the focus range.

In various implementations, such processes may be utilized for obtaining an image stack. For example, as the VFL lens L4 and corresponding overall focus position of the optical system is modulated sinusoidally, different images of the workpiece are captured as corresponding to different phase timings and different corresponding Z-coordinates. As a simplified example, if the focus range Refp is 100 mm and images are captured in 1 mm steps, the image stack may include 100 images, with each captured image corresponding to a different Z-coordinate in 1 mm steps throughout the 100 mm focus range. U.S. Pat. No. 8,581,162 describes various techniques for the acquisition and utilization of image stacks, and is hereby incorporated herein by reference in its entirety. In various implementations, an image stack and/or images outside of an image stack may also be acquired in a system with or without a VFL lens (e.g., when a VFL lens is not utilized, the system may utilize a mechanical movement system to change a focus position along the Z-axis for obtaining an image of the workpiece feature).

As a specific example of acquiring images outside of an image stack, in one implementation a third workpiece feature WPF1C (e.g., at an entrance to the entrance portion EN1 of the aperture AP1, as may correspond to an outside surface of the workpiece 220) is to be imaged but may be outside of a current range Refp such as illustrated in FIG. 2. In such an implementation, a movement mechanism (e.g., the movement mechanism 110 of FIG. 1 and/or other movement mechanism) may be configured and utilized to move the front vision components portion 205A along the Z-axis to change the focus position of the optical system relative to the workpiece 220 so that the third workpiece feature WPF1C will be in focus in a corresponding image that is to be acquired. In various implementations, the movement mechanism (e.g., the movement mechanism 110) may include various controllable motors that drive actuators and/or other components for achieving motion of the front vision components portion 205A along the X, Y and/or Z-axis directions.

In various implementations, a movement mechanism (e.g., the movement mechanism 110 of FIG. 1 and/or other movement mechanism) may also or alternatively be configured to rotate or otherwise move a different objective lens into the position of objective lens L2, for which the different objective lens may have a lower magnification and/or otherwise provide a larger range Refp in combination with the operation of the VFL lens L4, so that the workpiece feature WPF1C may fall within the increased range (e.g., and may be imaged as part of an image stack or individual image as part of the operation of the VFL lens L4, etc.). In various implementations, certain other methods may also or alternatively be utilized for increasing the range Refp (e.g., so that the workpiece feature WPF1C may fall within the increased range). For example, the lens controller may be configured/utilized to increase the resonant frequency of the VFL lens L4, to increase the optical power of the VFL lens L4 and correspondingly increase the range Refp. As another example, the lens controller 280 may be configured/utilized to increase the driving signal amplitude to the VFL lens L4, to increase the optical power of the VFL lens L4 and correspondingly increase the range Refp.

In various implementations, the optional focus signal processing portion 275 may input data from the camera CMOS and may provide data or signals that are utilized to determine when an imaged surface region (e.g., of the aperture AP1 of the workpiece 220) is at an effective focus position. For example, in various implementations a group of images acquired by the camera CMOS at different effective focus positions (Z-coordinates), such as part of an image stack, may be analyzed using a known "maximum contrast" or "best-focus image" analysis to determine when an imaged surface region of the workpiece 220 is at a corresponding effective focus position (Z-coordinate). However, more generally, any other suitable known image focus detection configuration may be used. In any case, the workpiece focus signal processing portion 275 or the like may input an image or images acquired during the periodic modulation of the effective focus position (sweeping of multiple effective focus positions) of the front vision components portion 205A (e.g., utilizing the VFL lens L4 and/or a movement mechanism, etc.), and determine an image and/or image timing at which a target workpiece feature (e.g., of the aperture AP1 of the workpiece 220) is best-focused.

In some implementations, the focus signal processing portion 275 may determine a phase timing of the VFL lens L4 corresponding to a best-focus of the target workpiece feature and output that "best-focus" phase timing value to the effective focus position calibration portion 273. The effective focus position calibration portion 273 may provide effective focus position (Z-coordinate) calibration data that relates respective effective focus positions (Z-coordinates) to respective "best-focus" phase timings within a period of a standard imaging resonant frequency of the VFL lens L4, wherein in some instances the calibration data may generally correspond to operating the VFL lens L4 according to a standard imaging drive control configuration or reference state. For example, in various implementations, the signal data from the camera CMOS may correspond to one or more images acquired by the camera (e.g., as part of an image stack), wherein contrast or other focus metric determinations as part of points-from-focus operations or other analysis may be performed to determine when an imaged surface region of a workpiece feature of the workpiece 220 is at a "best-focus" position. Exemplary techniques for the determination and analysis of image stacks and focus curves, and for points-from-focus operations, are taught in U.S. Pat. Nos. 6,542,180; 8,581,162 and 9,060,117, each of which is hereby incorporated herein by reference in its entirety.

Generally speaking, the effective focus position calibration portion 273 comprises recorded effective focus position (Z-coordinate) calibration data (e.g., as determined by calibration processes such as those disclosed in the incorporated references). As such, its representation in FIG. 2 as a separate element is intended to be a schematic representation only, and not limiting. In various implementations, the associated recorded effective focus position (Z-coordinate) calibration data may be merged with and/or indistinguishable from the lens controller 280, the workpiece focus signal processing portion 275, or a host computer system connected to the system signal and control bus 295, etc. In various implementations, the exposure (strobe) time controller 233es, the effective focus position calibration portion 273, the workpiece focus signal processing portion 275, the lens controller 280 and/or any other portions utilized for control, etc., of the front vision components portion 205A may be included as part of a control system portion (e.g., the control system portion 120 of FIG. 1) of the metrology system 200. In various implementations, such a control system portion or any portions thereof may be included as part of the front vision components portion 205A.

In various implementations, the exposure (strobe) time controller 233es controls an image exposure time of the front vision components portion 205A (e.g., relative to a phase timing of the periodically modulated effective focus position). More specifically, in some implementations, during an image exposure, the exposure (strobe) time controller 233es (e.g., using the effective focus position (Z-coordinate) calibration data available in the effective focus position calibration portion 273), may control the light source PLS to strobe at a respective controlled time (e.g., so that each image of an image stack will be acquired at a different focus position corresponding to a known Z-coordinate within a focus range). For example, the exposure (strobe) time controller 233es may control the light source PLS (e.g., a strobe light source) to strobe at a respective phase timing within a period of a standard imaging resonant frequency of the VFL lens L4, so as to acquire an image having a particular effective focus position (e.g., with a corresponding known Z-coordinate) within the sweeping (periodic modulation) range of the VFL lens L4. In other implementations, the exposure time controller 233es may control a fast electronic camera shutter of the camera CMOS to acquire an image at a respective controlled time and/or its associated effective focus position (Z-coordinate). In some implementations, the exposure (strobe) time controller 233es may be merged with or indistinguishable from the camera CMOS. It will be appreciated that the operations of the exposure time controller 233es and other features and elements outlined above may be implemented to govern the image stack acquisition.

A coordinate system of FIG. 2 is indicated as including orthogonal X, Y and Z-axes. In various implementations, the optical axis OA of the front vision components portion 205A may define and/or be aligned or parallel with, the Z-axis. In some implementations, the coordinate system may be a local coordinate system of the front vision components portion 205A (e.g., for which the optical axis OA of the front vision components portion 205A may define the Z-axis). In other implementations, the coordinate system may be a local coordinate system of the workpiece 220 (e.g., for which it may be desirable to have the optical axis OA of the front vision components portion 205A aligned with and/or parallel to the Z-axis). In other implementations, the coordinate system may be a local coordinate system of a movement mechanism that moves the front vision components portion 205A (e.g., the movement mechanism 110, for which it may be desirable to have the optical axis OA of the front vision components portion 205A aligned with and/or parallel to the Z-axis of the coordinate system, and for which the movement mechanism may control movement of the front vision components portion 205A along the directions of the X and Y axes). In other implementations, other local coordinate systems may also or alternatively be established (e.g., for the images of the image stack, etc.). In various implementations, it may be desirable for any such local coordinate systems to generally have their Z-axes at least approximately aligned and/or in parallel, etc., with each other. In various implementations, as part of a local coordinate system, in addition to or as an alternative to X, Y and Z coordinates, certain types of cylindrical coordinates, Cartesian coordinates, or other coordinates may be utilized (e.g., with respect to the orientation of the front vision components portion 205A and/or the determination of the coordinates of measured surface points, such as surface points within a cylindrical portion of the aperture AP1 of the workpiece 220, such as surface points of workpiece features of the through-hole portion TH1 of the aperture AP1, etc.).

In various implementations, it may be desirable to obtain an image stack that includes images of workpiece features located at different Z-coordinates (e.g., such as the first and second workpiece features WPF1A and WPF1B located at opposite ends of the through-hole portion TH1 of the aperture AP1 that is oriented along the Z-axis). In such implementations, an image stack may be acquired and operations may be performed, including determining first and second local focus peaks and/or other indicators (e.g., as indicating effective focus positions EFP corresponding to each of the first and second workpiece features WPF1A and WPF1B).

In various implementations, an image stack for determining the focus positions of the first and second workpiece features WPF1A and WPF1B may include a sufficient number of images for determining focus positions of workpiece features with a high degree of accuracy (e.g., in some implementations at least 30 images, or at least 60 images, etc.).

In various implementations, the workpiece 220 (or the workpiece 20 in FIG. 1) may have many apertures extending through the workpiece (e.g., at least 1000, or 10000, or 100000 apertures, etc.). In various implementations, the dimensions of the workpiece 220 along the X and Y axes may be relatively large (e.g., greater than 1 meter, etc.) and for which the thickness along the Z-axis may be relatively less (e.g., less than 5%, 2%, or 1% of the dimension along the X and/or Y axes). In various implementations, it may be desirable to measure various aspects of the apertures, such as diameters and distances between various workpiece features of the apertures (e.g., diameters and distance between the first and second workpiece features WPF1A and WPF1B, etc.). In various implementations, the dimensions of the back vision components portion 205B along the X and Y axes may be relatively large and similar to those of the workpiece 220 (e.g., greater than 1 meter, etc.), while the dimensions of the front vision components portion 205A along the X and Y axes may be relatively smaller (e.g., less than 10 percent of the dimensions of the back vision components portion 205B).

In operation, the workpiece 220 is positioned between the front vision components portion 205A and the back vision components portion 205B. The movement mechanism 110 is utilized to adjust a relative position between the front vision components portion 205A and the workpiece 220 in a direction that is transverse to the optical axis OA of the front vision components portion 205A, to thereby align the optical axis OA of the front vision components portion 205A with the aperture AP1 of the workpiece 220 such that at least a portion of the light from the light source PLS that is provided along the optical axis OA passes through the aperture AP1 and is reflected by the reflective surface M2 of the back vision components portion 205B to travel back to the aperture AP1 for providing at least part of the illumination for imaging the aperture AP1. The camera CMOS is utilized to acquire an image stack comprising a plurality of images of the aperture AP1 as illuminated at least in part by light from the light source PLS, wherein each image of the image stack corresponds to a different focus position along the optical axis OA of the front vision components portion 205A as corresponding to a phase timing of the periodic modulation of the optical power of the VFL lens L4. A measurement related to a workpiece feature of the aperture AP1, such as a diameter of the aperture AP1 and/or a distance between workpiece features of the aperture, is determined based at least in part on an analysis of the image stack.

In various implementations, an image stack may be acquired for measuring the workpiece features WPF1A and WPF1B, as described herein, while for measuring the workpiece feature WPF1C, an autofocus cycle or other imaging process may be performed (e.g., including utilizing a movement mechanism to move the front vision components portion 205A along the Z-axis as part of the autofocus cycle). In certain alternative implementations, an image stack may be acquired for measuring all three of the workpiece features WPF1A, WPF1B and WPF1C.

In various implementations (e.g., where the workpiece 220 of FIG. 2 is relatively large along the X and Y axes dimensions), it may be particularly desirable to have the back vision components portion 205B with similar (e.g., relatively large) dimensions along the X and Y axes. By utilizing such a configuration with a sufficiently sized reflective surface M2 included in the back vision components portion 205B, this eliminates the need for certain alternative configurations (e.g., in which a moveable light source and/or other components are included as part of the back vision components portion 205B for which the movement is coordinated with the movement of the front vision components portion 205A, which would require a second movement mechanism as part of the back vision components portion 205B which would correspond to additional complexity, etc.).

In various implementations where the polarization altering component FR of the back vision components portion 205B comprises a retarder (e.g., a film retarder), the retarder may be a type of waveplate (e.g., a quarter waveplate QWP). It will be appreciated that a retarder (e.g., a film retarder) of the back vision components portion 205B may be a relatively economical component for covering a relatively large area (e.g., for covering behind a workpiece with a corresponding relatively large area).

In operation in the configuration of FIG. 2, the first linear polarizer LP1 of the front vision components portion 205A may convert the light from the light source PLS into linearly polarized light (e.g., with horizontal polarization). The quarter waveplate QWP of the front vision components portion 205A may convert the linearly polarized light into elliptically or circularly polarized light. In various implementations, some or all of the polarization altering components of the system 200 (e.g., the first and second linear polarizers LP1 and LP2 and the quarter waveplate QWP of the front vision components portion 205A and the polarization altering component FR of the back vision components portion 205B) may be tuned (e.g., adjusted in terms of orientation and/or position) in order to achieve a maximum contrast for images at a desired Z-coordinate (e.g., such as proximate to the workpiece feature WPF1B). In various implementations, the workpiece feature WPF1B may be regarded as presenting particular challenges for achieving a desired level of image contrast, as compared to the workpiece features WPF1A and WPF1C, for which achieving a desired level of image contrast may be regarded as relatively less complex, due in part to the nature of the respective workpiece features and their relative locations with respect to the camera CMOS and light from the light source PLS, etc.

In various implementations, the configuration of FIG. 2 achieves a type of optical isolation, in which imaged light reflected from the workpiece features WPF1A and WPF1C may have a different polarization than reflected light from the reflective surface M2 of the back vision components portion 205B that is utilized for imaging the second workpiece feature WPF1B (i.e., due to the polarization altering component FR in the back vision components portion 205B). The different polarization enables some of the reflected light (e.g., from the workpiece features WPF1A and WPF1C) to be isolated or otherwise reduced at the camera CMOS (e.g., when imaging the second workpiece feature WPF1B). More specifically, in various applications, reflected light from the workpiece features WPF1A and WPF1C may have a relatively high brightness or otherwise be relatively strong (e.g., with a relatively significant amount of glare, etc.), which may make it more difficult to effectively image the second workpiece feature WPF1B with a desired level of contrast. The utilization of the configuration of FIG. 2 effectively enables imaging of the second workpiece feature WPF1B with a desired level of reflected light with a corresponding polarization from the back vision components portion 205B (e.g., and with an acceptably lower level of light as reflected with the different polarization from the workpiece features WPF1A and WPF1C).

In short, by utilizing the back vision components portion 205B including the reflective surface M2 for reflecting the light for imaging the second workpiece feature WPF1B in a way so that imaging light may be isolated (e.g., isolated from the light reflected from the other workpiece features such as the workpiece features WPF1A and WPF1C and otherwise within the aperture AP1), the second workpiece feature WPF1B may more effectively be imaged (e.g., with better contrast, etc.). The polarization altering component FR (e.g., a film retarder) of the back vision components portion 205B is noted to assist with this isolation process (i.e., by altering the polarization of the reflected light from the back vision components portion 205B that is utilized for the imaging of the second workpiece feature WPF1B, so that that light can be isolated from other light that is reflected by other workpiece features of the aperture AP1, such as the workpiece features WPF1A and WPF1C, etc.).

In various implementations, without the inclusion of the polarization altering component FR (e.g., a film retarder) in the back vision components portion 205B, the brightness of the light reflected back for imaging the second workpiece feature WPF1B may be significantly below the brightness of the reflected light from other workpiece features, such as the workpiece features WPF1A and WPF1C (e.g., in some implementations as much as five times, or ten times, below such other reflected light), resulting in a lower contrast than may be desired for effectively imaging the second workpiece feature WPF1B.

In various implementations, after the image stack is obtained, analysis of the image stack may be performed (e.g., including evaluating contrast and/or other factors) in order to determine the relative focus positions (e.g., in terms of Z-coordinates) of the first and second workpiece features WPF1A and WPF1B. A distance between the workpiece features WPF1A and WPF1B may then be determined in accordance with a difference between the corresponding Z-coordinates. In further regard to such analysis, once an in-focus image for each workpiece feature WPF1A and WPF1B is determined (e.g., in accordance with an image in the image stack that is closest to the in-focus position for the respective workpiece feature), corresponding dimensions of the workpiece features may be determined utilizing the best focused images of the workpieces. For example, a diameter of each of the workpiece features may be determined by performing measurement operations on the respective in-focus image of the workpiece feature. In one implementation, an equivalent diameter may be determined by performing thresholding on an image, and determining a sum of the pixels within the threshold area (e.g., as representing an equivalent area of the workpiece feature), and from which an equivalent diameter may be determined (e.g., for which the equivalent area of the workpiece feature may be considered as a circular area with a corresponding equivalent diameter).

It will be appreciated that the polarization altering component FR of the back vision component portion 205B enables accurate measurements to be performed for workpiece features such as the second workpiece feature WPF1B, even when the workpiece 220 includes many such workpiece features as part of many apertures (e.g., over 1000 apertures, or over 100000 apertures, etc.) that need to be inspected/measured as part of an inspection/measurement process. For such workpieces, there may be some variances between the many apertures (e.g., in terms of lengths of various portions, diameters of various portions, etc.) for which it is advantageous to be able to quickly and accurately measure the desired workpiece features (e.g., to determine if the variances are within acceptable manufacturing tolerances, etc.). In this regard, the utilization of the polarization altering component FR in the back vision components portion 205B helps enable the system to accurately measure workpiece features such as the second workpiece feature WPF1B, even when such variances occur (e.g., as opposed to a system in which accurate measurements of workpiece features such as the second workpiece feature WPF1B depend on the workpiece features being within a narrow range of positions and/or sizes that the system is only configured to measure). More specifically, the configuration of FIG. 2 (i.e., including the polarization altering component FR of the back vision components portion 205B) enables workpiece features (e.g., such as the second workpiece feature WPF1B) to be imaged with acceptable levels of contrast (e.g., due in part to the different polarization of the reflected light) over a relatively large range of possible positions (e.g., along the Z-axis) of such workpiece features.

In various implementations, the aspect ratio of the aperture AP1 and/or certain portions thereof (e.g., the through-hole portion TH1) may be relatively high (e.g., greater than two to one) such that the dimension extending along the Z-axis is greater than the diameter or other cross dimension along the X and/or Y axis directions.

In various implementations, the diffuser LSD (e.g., a light shaping diffuser) of the back vision components portion 205B helps ensure that sufficient light is reflected into the aperture AP1 for the imaging (e.g., the imaging of the second workpiece feature WPF1B), even if there may be slight imperfections in the surface and/or orientation of the reflective surface M2 (e.g., a mirrored surface) of the back visions component portion 205B. More specifically, in implementations where all or part of the reflective surface M2 may be slightly misaligned or otherwise have imperfections, the diffuser LSD helps ensure that a sufficient amount of the reflected light will be directed into the aperture AP1 for performing the desired imaging. In various implementations, the diffuser LSD may be configured to perform a relatively low angular diffusion (e.g., two degree circular).

Figure 3:
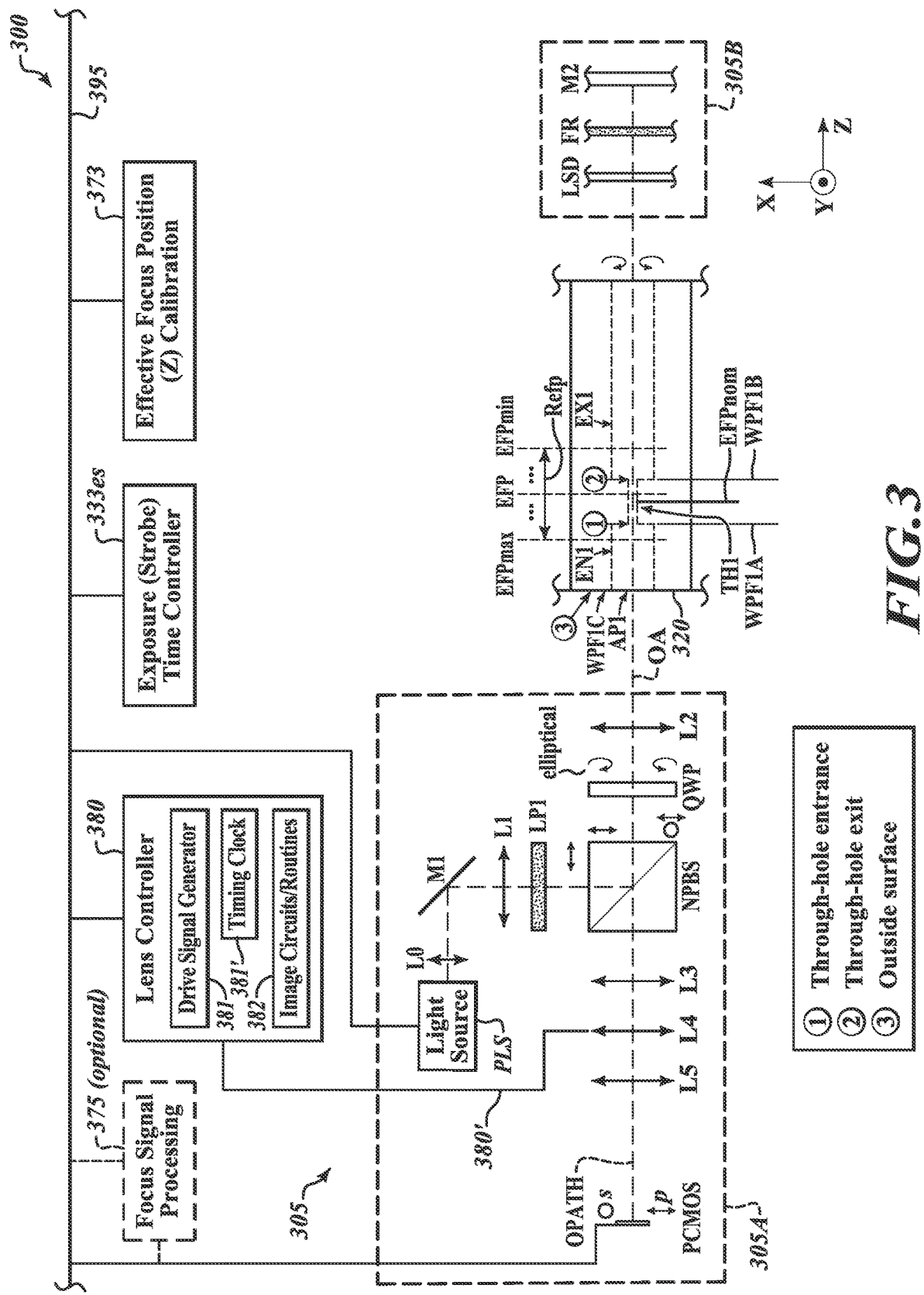
FIG. 3 is another schematic diagram of a metrology system that includes a front vision components portion and a back vision components portion and that may be operated according to principles disclosed herein.

FIG. 3 illustrates another metrology system 300 that includes a front vision components portion 305A and a back vision components portion 305B and that may be operated according to principles disclosed herein. It will be appreciated that certain numbered components 3XX of FIG. 3 may correspond to and/or provide similar operations or functions as similarly numbered components 2XX of FIG. 2, and may be similarly understood unless otherwise indicated.

As shown in FIG. 3, the metrology system 300 includes the front vision components portion 305A (e.g., which is coupled to and movable by a movement mechanism, such as the movement mechanism 110 of FIG. 1) and the back vision components portion 305B. The metrology system 300 also includes a control system portion (e.g., such as the control system portion 120 of FIG. 1) which, in the illustrated example, comprises a lens controller 380, an exposure (strobe) time controller 333es, an effective focus position (Z-coordinate) calibration portion 373, and a workpiece focus signal processing portion 375 (optional), which may have similar operations as the corresponding components described above with respect to FIG. 2.

In comparison to the front vision components portion 205A of FIG. 2, in the front vision components portion 305A of FIG. 3, the second linear polarizer LP2 of FIG. 2 is removed, and a polarization camera PCMOS is included that alters the polarization of light received from the VFL lens L4. The utilization of the polarization camera PCMOS enables certain adjustments (e.g., for the tuning of the polarizing components) to achieve a desired level of contrast for different workpieces and/or workpiece features to be measured (e.g., which may be located at different relative Z-coordinates, etc.). The other components and operations of the front vision components portion 305A and the back vision components portion 305B are generally similar to those of the front vision components portion 205A and the back vision components portion 205B.

Some example operations of the metrology system 100/200/300 will be described in more detail below with respect to FIGS. 4 and 5.

Figure 4:
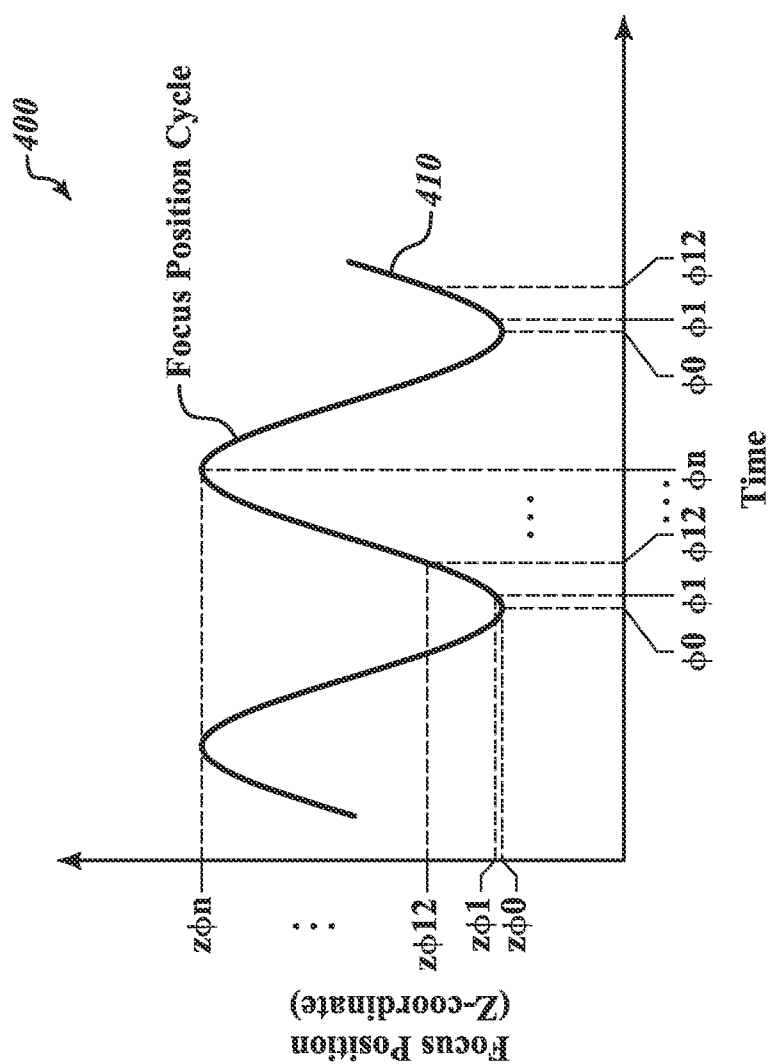
FIG. 4 is a chart of a timing diagram showing a periodically modulated focus position of the front vision components portion of FIGS. 1-3 as controlled by periodically modulating the focal length of a variable focal length lens in the front vision components portion, and also qualitatively showing how strobed illumination can be timed to correspond with a respective phase timing of the periodically modulated focus position to expose an image focused at a respective Z-coordinate.

FIG. 4 is a chart of a timing diagram 400 illustrating a periodically modulated focus position of the front vision components portion 200/300 of FIG. 2 or 3 as controlled by periodically modulating the focal length of the VFL lens L4 in the front vision components portion 205A/305A, as outlined above. In the illustrated example, each focus position has a corresponding Z-coordinate, for which an optical axis and/or focus axis of the front vision components portion 205A/305A may define and/or otherwise be aligned (e.g., be coaxial or in parallel with, etc.) a Z-axis of a corresponding coordinate system (e.g., for which the Z-coordinates may alternatively be referenced as Z-axis coordinates). The periodically modulated focus position is represented by a sinusoidal curve 410. The relationship of the focus position (i.e., as indicated by corresponding Z-coordinates) to the phase timing may be established by calibration according to known principles (e.g., by repeatedly stepping a surface to a known Z-coordinate, and then manually or computationally determining the phase timing that best focuses an image at the known Z-coordinate, and storing that relationship in a lookup table or the like).

The diagram 400 also qualitatively shows how strobed illumination can be timed to correspond with a respective phase timing (e.g., $\phi 0$, $\phi 1$, $\phi 12$, $\phi n$, etc.) of the periodically modulated focus position to expose an image focused at a respective Z-coordinate (e.g., $z\phi 0$, $z\phi 1$, $z\phi 12$, $z\phi n$, etc.). That is, in the illustrated example, while the camera CMOS/PCMOS is acquiring an image during an integration period, if a strobe pulse is short relative to the period of the focus modulation and is provided at the phase timing $\phi 0$, then the focus position will be at the Z-coordinate $z\phi 0$, and any workpiece surface that is located at the Z-coordinate $z\phi 0$ will be in focus in the resulting image. A similar description applies for the other exemplary phase timings and Z-coordinates shown in the diagram 400.

It will be understood that the phase timings shown in the diagram 400 are exemplary only and not limiting. More generally, any phase timing selected by a user or automatically selected by a control system will have an associated focus position within the range of Z-coordinates $z\phi 0$-$z\phi n$, which represent the minimum and maximum Z-coordinates of the periodically modulated focus position. It will also be understood that if one strobe pulse at a particular phase timing is not sufficient to provide a well exposed image, the strobe pulse may be repeated at that particular phase timing for any desired number of periods within the image integration period (as schematically illustrated by the repeated instances of any of the exemplary phase timings $\phi 0$, $\phi 1$, $\phi 12$ in the diagram 400). For example, one, or several, or thousands, etc., of such pulses may be integrated in an integration period, in some embodiments or implementations. The effect will be to increase the image exposure corresponding to that particular phase timing and/or Z-coordinate in the resulting image. As one specific example implementation, for a variable focal length lens that modulates at a frequency of 72 kHz and an imaging array in a camera operating at 30 frames per second, a single camera frame acquisition time corresponds to 2,400 cycles of the variable focal length lens and the resulting focus position Z-coordinate. It will be appreciated that the exemplary phase timings $\phi 1$ and $\phi 12$ are shown on a rising slope of the focus position cycle. In some embodiments, pulses may also be integrated in an integration period which corresponds to the same Z-coordinates during a falling slope of the focus position cycle.

Figure 5:
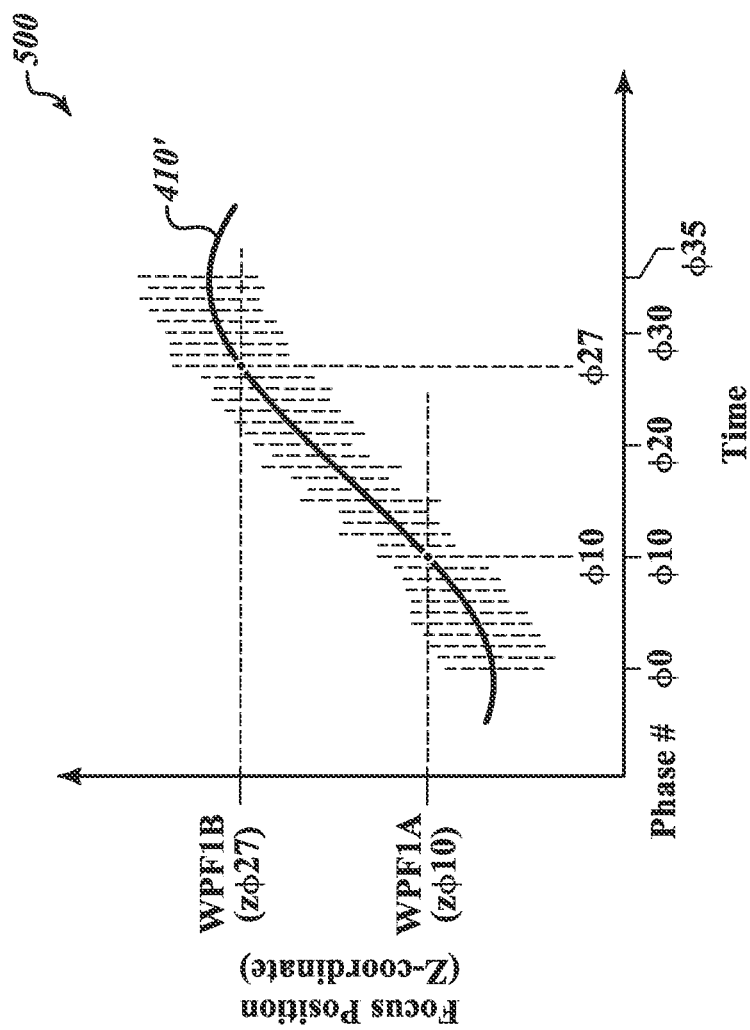
FIG. 5 is a chart showing an expanded portion of the periodically modulated focus position shown in FIG. 4, phase timings corresponding to those usable to collect an image stack, and also qualitatively showing how first and second instances of strobed illumination that correspond with first and second phase timings of the periodically modulated focus position can be utilized to produce corresponding exposure images that provide image focus for workpiece features that are located at different Z-coordinates.

FIG. 5 is a chart 500 showing a horizontally expanded portion 410' of the sinusoidal curve 410 of the periodically modulated focus position shown in FIG. 4, and phase timings corresponding to those usable to collect an image stack (e.g., represented by the phase timing positions of the vertical dashed lines in the chart 500). FIG. 5 also qualitatively shows how first and second particular instances of strobed illumination that correspond with first and second phase timings (e.g., in this particular example exemplary phase timings $\phi$10 and $\phi$27) of the periodically modulated focus position can be utilized to produce corresponding exposure images that provide image focus for workpiece features that are located at different Z-coordinates (e.g., such as a first workpiece feature located at a first Z-coordinate Z$\phi$10 and a second workpiece feature located at a second Z-coordinate Z$\phi$27).

Regarding the phase timings corresponding to those usable to collect an image stack (represented by the phase timing positions of the vertical dashed lines in the chart 500), in accordance with principles disclosed herein, in one implementation an image stack (or multiple image stacks) may be acquired with respect to one or more regions of interest of a representative workpiece. For example, an image stack may be acquired by exposing a first image using one or more strobe illumination pulses (e.g., over one or more periods) coinciding with the phase timing $\phi$0. A second image in the image stack may be similarly acquired using the phase timing $\phi$1, and so on up to phase timing $\phi$35 in the illustrated example. It will be understood that an image stack images a field of view using various focus positions, and generally can include any desired number of images with focus positions corresponding to desired Z-coordinates, acquired using corresponding phase timings.

As noted above, FIG. 5 illustrates in part how first and second particular instances of strobed illumination that correspond with first and second phase timings (e.g., the exemplary phase timings $\phi$10 and $\phi$27) of the periodically modulated focus position can be utilized to produce corresponding exposure images that provide image focus for workpiece features that are located at different Z-coordinates (e.g., such as the first workpiece feature WPF1A located at a first Z-coordinate z$\phi$10, and the second workpiece feature WPF1B located at a second Z-coordinate z$\phi$27). As a specific example with respect to FIGS. 2 and 3, the first and second workpiece features WPF1A and WPF1B at first and second Z coordinates could be an entrance and an exit, respectively, of the through-hole portion TH1 of the aperture AP1.

As illustrated in FIG. 5, the first and second workpiece features WPF1A and WPF1B in the field of view on a representative workpiece are indicated as having a sufficient image focus in respective images of an image stack. The first workpiece feature WPF1A is indicated as being best or sufficiently focused at a Z-coordinate Z$\phi$10 which corresponds to a phase timing of $\phi$10, and the second workpiece feature WPF1B is indicated as being best or sufficiently focused at a Z-coordinate Z$\phi$27 which corresponds to a phase timing of $\phi$27. In various implementations, the contrast in one or more regions of interest may be analyzed (e.g., according to known methods) in each image of an image stack. Utilizing such processes, the particular images and/or interpolated Z-coordinates indicated as providing the best or sufficient contrast and focus for the first and second workpiece features WPF1A and WPF1B, respectively, may be determined.

In various implementations, a determination of an image which has the best or sufficient image focus for a workpiece feature in a region of interest may be made according to various techniques. In one specific example implementation, a technique including an analysis of a focus curve may be utilized. A focus curve may be formed based on focus curve data points, which may be established according to known methods (e.g., as described in incorporated references). Briefly, in one exemplary method, for each captured image in the image stack, a focus metric value is calculated based on the respective region of interest in that image, and that focus metric value becomes a data point on the focus curve (e.g., related to the corresponding phase timing and Z-coordinate at which the image was captured). This results in focus curve data, which may be referred to simply as a "focus curve" or "autofocus curve." Exemplary techniques for the determination and analysis of image stacks and focus curves are taught in U.S. Pat. Nos. 8,581,162; 9,060,117 and 10,880,468, each of which is hereby incorporated herein by reference in its entirety.

In various implementations, the analysis of an image stack includes determining focus curve data for the image stack which indicates a focus position at which a workpiece feature of the aperture AP1 is in focus (e.g., as may correspond to a local peak or other characteristic of the focus curve). For example, the focus curve data may indicate a first focus position at which the first workpiece feature WPF1A of the aperture AP1 is in focus, and a second focus position at which the second workpiece feature WPF1B of the aperture AP1 is in focus. A measurement related to the first and second workpiece features WPF1A and WPF1B may be made based on an analysis of the focus curve data. For example, a distance between the first workpiece feature WPF1A and the second workpiece feature WPF1B may be determined based on an analysis of the focus curve data.

In various implementations, apertures in a workpiece may be formed through a drilling process (e.g., laser drilling, mechanical drilling, etc.) or other machining process. As part of such processes, certain workpiece features (e.g., the first and second workpiece features WPF1A and WPF1B) may correspond to an entrance and exit of a drilling hole (e.g., an entrance and exit of a through-hole portion, such as the through-hole portion TH1). In regard to such workpiece features, certain aspects may be important to inspect (e.g., due to the possibility of debris, extra material, or other imperfections that may remain at such an entrance or exit after the drilling or other machining process is complete, for which the presence of such imperfections may affect the performance of the workpiece, etc.). As will be described in more detail below with respect to FIGS. 6A and 6B, imperfections (e.g., such as debris, extra material, etc.) at the first or second workpiece feature WPF1A or WPF1B (i.e., at the entrance or exit of the through-hole portion TH1) may generally be visible in an image that is well focused at the Z-coordinate of the respective workpiece feature.

FIGS. 6A and 6B are relatively in-focus images of the first and second workpiece features WPF1A and WPF1B captured, for example, at phase timings of $\phi$10 and $\phi$27 as illustrated in FIG. 5, with the workpiece features WPF1A and WPF1B at Z-coordinates of $\phi$10 and $\phi$27, respectively. The through-hole portion TH1 may be formed by a drilling process, for which both the entrance and the exit have certain imperfections/defects. More specifically, sections SEC1A and SEC1B of the first and second workpiece features WPF1A and WPF1B, respectively, each illustrate a small amount of material extending into the through-hole portion TH1 as part of each respective workpiece feature (i.e., as an imperfection/defect relative to a desired perfectly round/circular workpiece feature at each end of the through-hole portion TH1, which may ideally be a perfectly cylindrical through-hole portion TH1). By obtaining in-focus images, imperfections in the sections SEC1A and SEC1B can be inspected, measured, etc., in the images of FIGS. 6A and 6B (e.g., to determine if the imperfections are within acceptable manufacturing tolerances, etc.).

Figure 7:
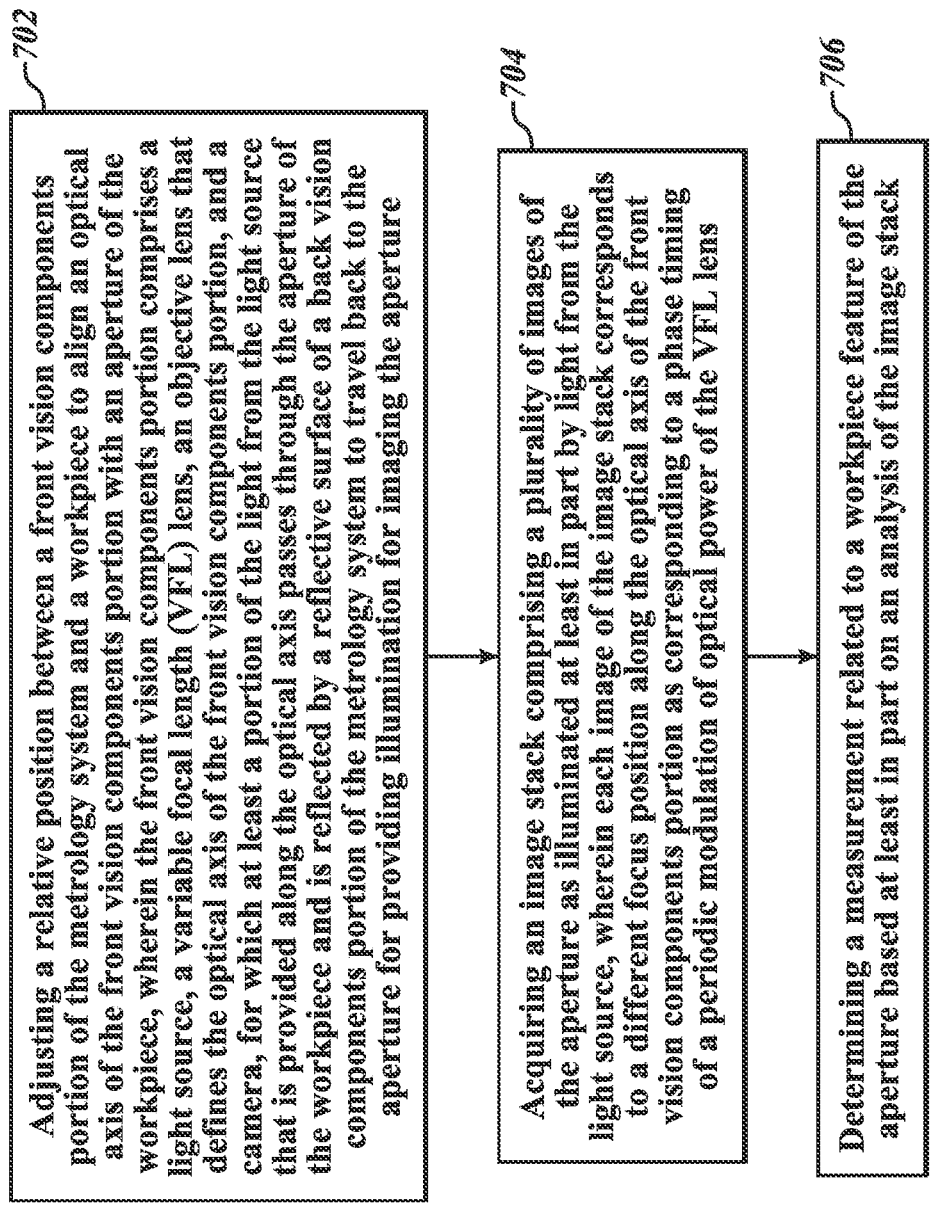
FIG. 7 is a flow diagram showing one example of a method for operating a metrology system including a front vision components portion and a back vision components portion to determine a measurement related to a workpiece feature of an aperture according to principles disclosed herein.

FIG. 7 is a flow diagram showing one example of a method for operating a metrology system including a front vision components portion and a back vision components portion to determine a measurement related to a workpiece feature of an aperture, according to principles disclosed herein.

Step 702 includes adjusting a relative position between the front vision components portion (105A/205A/305A) of the metrology system (100/200/300) and the workpiece (20/220/320) to align an optical axis (OA) of the front vision components portion with an aperture (API) of the workpiece, wherein the front vision components portion comprises a light source (PLS), a variable focal length (VFL) lens (L4), an objective lens (L2) that defines the optical axis of the front vision components portion, and a camera (CMOS/PCMOS), for which at least a portion of the light from the light source that is provided along the optical axis passes through the aperture of the workpiece and is reflected by a reflective surface (M2) of the back vision components portion (105B/205B/305B) of the metrology system to travel back to the aperture for providing illumination for imaging the aperture.

Step 704 includes acquiring an image stack comprising a plurality of images of the aperture as illuminated at least in part by light from the light source (PLS), wherein each image of the image stack corresponds to a different focus position along the optical axis of the front vision components portion (105A/205A/305A) as corresponding to a phase timing of a periodic modulation of optical power of the VFL lens (L4).

Step 706 includes determining a measurement related to a workpiece feature of the aperture (AP1) based at least in part on an analysis of the image stack.

While preferred implementations of the present disclosure have been illustrated and described, numerous variations in the illustrated and described arrangements of features and sequences of operations will be apparent to one skilled in the art based on this disclosure. Various alternative forms may be used to implement the principles disclosed herein.

All of the U.S. patents and U.S. patent applications referred to in this specification are incorporated herein by reference, in their entirety. Aspects of the implementations can be modified, if necessary to employ concepts of the various patents and applications to provide yet further implementations. These and other changes can be made to the implementations in light of the above-detailed description. In general, in the following claims, the terms used should not be construed to limit the claims to the specific implementations disclosed in the specification and the claims, but should be construed to include all possible implementations along with the full scope of equivalents to which such claims are entitled.

The invention claimed is:

1. A metrology system, comprising:
  a front vision components portion, comprising:
    a light source;
    a variable focal length (VFL) lens that is controlled to periodically modulate optical power of the VFL lens over a range of optical powers that occur at respective phase timings within the periodic modulation;
    an objective lens that inputs workpiece light arising from a workpiece which is illuminated by the light source, and transmits the workpiece light along an imaging optical path that passes through the VFL lens, the objective lens defining an optical axis of the front vision components portion; and
    a camera that receives the workpiece light transmitted by the VFL lens along the imaging optical path and provides a corresponding workpiece image exposure;
  a back vision components portion comprising a reflective surface, wherein the system is configured to have a workpiece positioned between the front vision components portion and the back vision components portion;
  a movement mechanism configured to adjust a relative position between the front vision components portion and the workpiece in a direction that is transverse to the optical axis of the front vision components portion;
  one or more processors; and
  a memory coupled to the one or more processors and storing program instructions that when executed by the one or more processors cause the one or more processors to at least:
    (a) utilize the movement mechanism to adjust a relative position between the front vision components portion and the workpiece to align the optical axis of the front vision components portion with an aperture of the workpiece such that at least a portion of the light from the light source that is provided along the optical axis passes through the aperture and is reflected by the reflective surface of the back vision components portion to travel back to the aperture for providing at least part of the illumination for imaging the aperture;
    (b) utilize the camera to acquire an image stack comprising a plurality of images of the aperture as illuminated at least in part by light from the light source, wherein each image of the image stack corresponds to a different focus position along the optical axis of the front vision components portion as corresponding to a phase timing of the periodic modulation of the optical power of the VFL lens; and
    (c) determine a measurement related to a workpiece feature of the aperture based at least in part on an analysis of the image stack.

2. The system of claim 1, wherein for each image of the image stack, the light source is controlled to provide at least one instance of strobed illumination timed to correspond with a respective phase timing of a periodically modulated focus position that corresponds to the respective focus position for that respective image of the image stack.

3. The system of claim 1, wherein the analysis of the image stack comprises determining an image of the image stack in which the workpiece feature is in focus, and the measurement comprises a dimension of the workpiece feature that is determined based at least in part on the in focus image.

4. The system of claim 3, wherein the dimension is a diameter of the workpiece feature.

5. The system of claim 1, wherein the analysis of the image stack comprises determining focus curve data for the image stack which indicates a focus position at which the workpiece feature is in focus.

6. The system of claim 5, wherein the workpiece feature is a first workpiece feature of the aperture and the focus position is a first focus position, and the focus curve data further indicates a second focus position at which a second workpiece feature of the aperture is in focus, wherein the measurement comprises a distance between the first workpiece feature and the second workpiece feature.

7. The system of claim 6, wherein the aperture comprises a through-hole portion, and the first and second workpiece features correspond to an exit and entrance of the through-hole portion, respectively.

8. The system of claim 1, wherein the aperture has an aspect ratio of greater than 2 to 1.

9. The system of claim 1, wherein the back vision components portion further comprises a polarization altering component that alters the polarization of the light from the light source that is reflected back to the aperture.

10. The system of claim 9, wherein the polarization altering component comprises at least one of a waveplate or a retarder.

11. The system of claim 9, wherein the polarization altering component comprises a film retarder.

12. The system of claim 9, wherein the back vision components portion further comprises a diffuser.

13. The system of claim 1, wherein the front vision components portion further comprises a polarization altering component that alters the polarization of light from the light source.

14. The system of claim 1, wherein the camera comprises a polarization altering component that alters the polarization of light received from the VFL lens.

15. The system of claim 1, wherein the front vision components portion further comprises a first linear polarizer that provides first linear polarization of light from the light source, and a second linear polarizer that provides second linear polarization of workpiece light that travels through the VFL lens to the camera, wherein the second linear polarization is orthogonal to the first linear polarization.

16. The system of claim 1, wherein the VFL lens is a tunable acoustic gradient lens.

17. A method for operating a metrology system, the method comprising:
(a) adjusting a relative position between a front vision components portion of the metrology system and a workpiece to align an optical axis of the front vision components portion with an aperture of the workpiece, wherein the front vision components portion comprises a light source, a variable focal length (VFL) lens, an objective lens that defines the optical axis of the front vision components portion, and a camera, for which at least a portion of the light from the light source that is provided along the optical axis passes through the aperture of the workpiece and is reflected by a reflective surface of a back vision components portion of the metrology system to travel back to the aperture for providing illumination for imaging the aperture;
(b) acquiring an image stack comprising a plurality of images of the aperture as illuminated at least in part by light from the light source, wherein each image of the image stack corresponds to a different focus position along the optical axis of the front vision components portion as corresponding to a phase timing of a periodic modulation of optical power of the VFL lens; and
(c) determining a measurement related to a workpiece feature of the aperture based at least in part on an analysis of the image stack.

18. The method of claim 17, wherein for each image of the image stack, the light source is controlled to provide at least one instance of strobed illumination timed to correspond with a respective phase timing of a periodically modulated focus position that corresponds to the respective focus position for that respective image of the image stack.

19. The method of claim 17, wherein the analysis of the image stack comprises determining focus curve data for the image stack which indicates a focus position at which the workpiece feature is in focus.

20. The method of claim 19, wherein the workpiece feature is a first workpiece feature of the aperture and the focus position is a first focus position, and the focus curve data further indicates a second focus position at which a second workpiece feature of the aperture is in focus, wherein the measurement comprises a distance between the first workpiece feature and the second workpiece feature.

21. A metrology system, comprising:
a front vision components portion, comprising:
a light source;
a variable focal length (VFL) lens that is controlled to periodically modulate optical power of the VFL lens over a range of optical powers that occur at respective phase timings within the periodic modulation;
an objective lens that inputs workpiece light arising from a workpiece which is illuminated by the light source, and transmits the workpiece light along an imaging optical path that passes through the VFL lens, the objective lens defining an optical axis of the front vision components portion; and
a camera that receives the workpiece light transmitted by the VFL lens along the imaging optical path and provides a corresponding workpiece image exposure; and
a back vision components portion comprising a reflective surface,
wherein the system is configured to:
(a) adjust a relative position between the front vision components portion and the workpiece to align the optical axis of the front vision components portion with an aperture of the workpiece such that at least a portion of the light from the light source that is provided along the optical axis passes through the aperture and is reflected by the reflective surface of the back vision components portion to travel back to the aperture for providing at least part of the illumination for imaging the aperture;
(b) acquire an image stack comprising a plurality of images of the aperture as illuminated at least in part by light from the light source, wherein each image of the image stack corresponds to a different focus position along the optical axis of the front vision components portion as corresponding to a phase timing of the periodic modulation of the optical power of the VFL lens; and
(c) determine a measurement related to a workpiece feature of the aperture based at least in part on an analysis of the image stack.

\* \* \* \* \*